[11] 3,624,168

[72] Inventor Chester E. Pawloski
Bay City, Mich.
[21] Appl. No. 878,905
[22] Filed Nov. 21, 1969
[45] Patented Nov. 30, 1971
[73] Assignee The Dow Chemical Company
Midland, Mich.

[54] 1,1-DIHALOALLENES
9 Claims, No Drawings
[52] U.S. Cl. .................................................. 260/654,
424/351, 162/161, 106/15 AF
[51] Int. Cl. ....................................................... C07c 21/00
[50] Field of Search............................................ 260/654 R

[56] References Cited
OTHER REFERENCES
Chem. Pharm. Bull. 13(11) 1374– 1376 (1965) Fumio Kai et al.

*Primary Examiner*—Leon Zitver
*Assistant Examiner*—A. Siegel
*Attorneys*—Griswold & Burdick, John L. Spalding and C. Kenneth Bjork ABSTRACT: Novel 1,1-dihaloallene compounds corresponding to the formula $$XC=C=CH_2$$
$$\phantom{XC=C=}I$$

and their preparation from 1,3-dihalopropynes by reaction with alkali metal iodides are disclosed.
The compounds are suitable for use as antimicrobials in controlling various bacteria and fungi.

1,1-DIHALOALLENES

SUMMARY

The present invention is directed to new and useful 1,1-dihaloallene compounds corresponding to the formula:

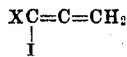

and a method of preparation according to the formula reaction:

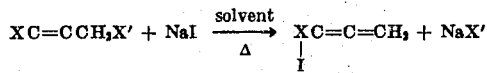

wherein X is bromine, chlorine, or iodine, and X' is bromine or chlorine. The compounds are viscous liquids at room temperature. They are somewhat soluble in many common organic solvents and of low solubility in water. The compounds are suitable for use as antimicrobials in controlling various bacteria and fungi.

The compounds of the present invention are usually prepared by the reaction of a predetermined 1,3-dihalopropyne compound with an alkali metal iodide, such as sodium or potassium iodide. The reaction proceeds in the presence of an organic solvent, such as acetone. The amount of the reactants employed in not critical, however, optimum yields are obtained when excess alkali metal iodide is used, the excess usually being in a 2:1 or 3:1 ratio to the amount of the 1,3-dihalopropyne used.

In carrying out the reaction, the predetermined 1,3-dihalopropyne compound is usually mixed initially with the other required reactants. However, the predetermined 1,3-dihalopropyne compound may also be controllably added to the alkali metal iodide and solvent during a period of approximately 1 hour. After the addition of all the reactants is complete, the reaction mass is stirred and heated at a temperature of from about 30° to about 50° C. for approximately 4 to 7 hours. The reaction mass is cooled and sufficient water added to form a 2-phase liquid mixture, from which the liquid organic phase containing the compound in solution is separated and heated moderately with steam under reduced pressure to remove low-boiling constituents. The compounds are recovered as viscous liquids at room temperature.

DESCRIPTION OF PREFERRED EMBODIMENTS

The following examples illustrate further the practice of the present invention and will enable those skilled in the art to practice the same.

EXAMPLE 1: 1,1-Diiodopropadiene

1-Iodo-3-chloro-propyne (80 grams; 0.4 mole) and sodium iodide (150 grams; 1.0 mole), were dispersed in 500 milliliters of acetone and stirred at a temperature of about 40° C. under atmospheric pressure for about 6 hours.

After cooling the reaction mass, water was added to form a two-phase mixture, and the organic layer containing the compound in solution was separated and heated moderately with steam under reduced pressure to remove low-boiling constituents. The 1,1-diiodopropadiene product mass was recovered as a viscous red liquid at room temperature. Analysis by infrared and mass spectroscopy methods confirmed that the primary constituent of the produce mass was 1,1-diiodopropadiene. The presence of small amounts of 1-iodo-1-chloropropadiene in the product mass was also confirmed.

EXAMPLE 2: 1-Bromo-1-iodopropadiene

Sodium iodide (50 grams; 0.33 mole) was dispersed in 200 milliliters of acetone and 1,3-dibromopropyne (30 grams; 0.15 mole) was controllably added to this mixture during a period of about 1 hour. The reaction mass was stirred at a temperature of about 40° C. under atmospheric pressure for approximately 5 hours. The procedures used in example 1 are utilized and the product mass recovered as a viscous liquid at room temperature. Analysis by the methods used in example 1 confirmed 1-bromo-1-iodopropadiene to be the primary constituent of the product mass. Small amounts of 1,1-dibromopropadiene were also confirmed as being present in the product mass.

EXAMPLE 3: 1-Chloro-1-iodopropadiene

Sodium iodide (150 grams; 1.0 mole) and 1,3-dichloropropyne (55 grams; 0.5 mole) were dispersed in 300 milliliters of acetone and reacted in essentially the same manner as in example 2.

Examination of the recovered product mass by the methods in example 2 revealed 1-chloro-1-iodopropadiene as the primary constituent of the product mass; the presence of small amounts of 1,1-dichloropropadiene in the product mass was also confirmed.

The novel compounds of the present invention are suitable for use as antimicrobials in controlling various bacteria and fungi. The novel compounds are particularly adapted for use as preservatives when included in various aqueous organic mixtures, such as latex paint. Furthermore, the compounds are active against slime control in paper processing operations.

In the fungicidal and bactericidal application of the dihalopropadiene compounds, the unmodified materials may be employed. However, the present invention also embraces the use of the compound in a formulation. Thus, for example, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water or water-in-oil emulsions, or water dispersions with or without the addition of wetting, dispersing or emulsifying agents.

In a representative operation of the fungicidal and bactericidal uses, a bacteriological culture medium containing 100 parts of 1,1-diiodopropadiene per million parts by weight of ultimate composition gave complete inhibition of rice blast, *Cercosphora beticola, Staphylococcus aureus, Escherichia coli, Candida albicans, Trichophyton mentagrophytes, Bacillus subtilis* and *Mycobacterium phlei*.

In another representative operation, samples of Latex 630 (produced by and available from The Dow Chemical Company), containing 0.2 part per million of 1,1-diiodopropadiene by wet weight of the latex sample at a pH of 8.5 were inoculated with a pooled culture of bacteria individually grown in nutrient broth. These bacteria had been isolated from contaminated latex or latex paint, and were largely *Pseudomonas* and *Aerobacter* species.

The inoculated samples were incubated for 24 hours at 30° C. and were streaked with a sterile swab on the surface of a nutrient agar petri plate. This agar plate was incubated for 48 hours at 30° C. and the presence or absence of viable bacteria in the latex sample was determined by the corresponding presence or absence of bacterial growth on the agar. Samples containing 0.2 parts per million by weight of the 1,1-diiodopropadiene compound withstood 10 such inoculations and incubations for 2 weeks without evidence of living bacteria.

These compounds have also shown activity against slime producing organisms and are useful in slime control in paper pulp processing operations. The 1,1-diiodopropadiene compound has shown particularly high activity against micro-organisms causing formation of slimes. A concentration of 10 parts per million of this compound was sufficient to give 100 percent kill in 24 hours of these organisms in an in vitro test, while a concentration of 500 parts per million gave a 100 percent kill in 3 hours.

The raw materials required for the preparation of the starting materials are known and are conveniently available. Starting materials, such as the 1-iodo-3-chloropropyne, are conveniently prepared by a reaction wherein potassium hydroxide (112 grams; 2.0 moles) and 170 milliliters of water are contacted and stirred in an ice water bath at temperatures near 0° C. A solution of iodine (about 128 grams; 1.0 mole), potassium iodide (about 120 grams; 0.7 mole), and 150 milliliters of water are added dropwise while propargyl chloride (38 grams; 0.5 mole) is added from another funnel. Water is added and the organic layer containing the product in solution is separated and heated under low pressure to remove low-boiling constituents and the desired starting material, 1-iodo-3-chloropropyne is recovered. Other starting materials, such as 1,3-dibromopropyne and 1,3-dichloropropyne are similarly prepared by utilizing the above method with the appropriate chemical analogs.

I claim:

1. 1,1-Dihaloallene compounds corresponding to the formula:

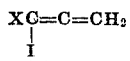

wherein X is iodine, bromine, or chlorine.

2. The compound of claim 1 which is 1,1-diiodopropadiene.

3. The compound of claim 1 which is 1-bromo-1-iodopropadiene.

4. The compound of claim 1 which is 1-chloro-1-iodopropadiene.

5. A method for producing 1,1-dihaloallene compounds corresponding to the formula:

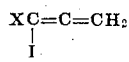

which comprises:

A. providing a reaction mass of a 1,3-dihalopropyne corresponding to the formula $XC\equiv CCH_2X'$ and an alkali metal iodide in an inert solvent, B. maintaining said reaction mass at a temperature of from about 30° to about 50° C. for a period of time sufficient to provide for substantial conversion to the corresponding 1,1-dihaloallene, and C. recovering said 1,1-dihaloallene compound, wherein X is bromine, chlorine or iodine, and X' is bromine or chlorine.

6. Process as in claim 5, including the initial step of providing a mixture of the alkali metal iodide in acetone, whereby the 1,3-dihalopropyne is controllably added to said mixture over a period of from about ½ to 2 hours while maintaining the the mixture at ambient temperature.

7. Process as in claim 5 wherein the amount of the alkali metal iodide ranges from about a two to threefold excess of that required stoichiometrically for reaction with said 1,3-dihalopropyne to prepare said 1,1-dihaloallene compound.

8. Process as in claim 5 wherein the reaction mass is maintained at the reaction temperature for a period of from about 3 to about 7 hours.

9. Process as in claim 5 wherein the 1,3-dihalopropyne reactant is 1,3-dibromopropyne or 1,3-dichloropropyne, and the alkali metal iodide is sodium iodide.

* * * * *